(12) United States Patent
Surlaker et al.

(10) Patent No.: US 7,895,600 B2
(45) Date of Patent: Feb. 22, 2011

(54) METHOD OF OPTIMIZING PROPAGATION OF NON-PERSISTENT MESSAGES FROM A SOURCE DATABASE MANAGEMENT SYSTEM TO A DESTINATION DATABASE MANAGEMENT SYSTEM

(75) Inventors: Kapil Surlaker, Mountain View, CA (US); Nimar Singh Arora, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 923 days.

(21) Appl. No.: 11/471,167

(22) Filed: Jun. 19, 2006

(65) Prior Publication Data

US 2007/0266393 A1    Nov. 15, 2007

Related U.S. Application Data

(60) Provisional application No. 60/799,754, filed on May 10, 2006.

(51) Int. Cl.
  *G06F 3/00* (2006.01)
(52) U.S. Cl. .................................................. 719/314
(58) Field of Classification Search ............... 719/314; 707/104.1
  See application file for complete search history.

(56) References Cited

U.S. PATENT DOCUMENTS

| | | | |
|---|---|---|---|
| 5,471,629 | A | 11/1995 | Risch |
| 5,592,664 | A | 1/1997 | Starkey |
| 5,666,486 | A | 9/1997 | Alfieri et al. |
| 5,828,882 | A | 10/1998 | Hinckley |
| 5,999,978 | A | 12/1999 | Angal et al. |
| 6,092,102 | A | 7/2000 | Wagner |
| 6,182,086 | B1 | 1/2001 | Lomet et al. |
| 6,292,825 | B1 | 9/2001 | Chang et al. |

(Continued)

OTHER PUBLICATIONS

Muthulingam et al., The Do's and Dont's of Space and Undo Management:Best Practices for Oracle Database 10g, Dec. 2004, 34 pages.*

(Continued)

*Primary Examiner*—Andy Ho
*Assistant Examiner*—Carina Yun
(74) *Attorney, Agent, or Firm*—Kilpatrick Townsend & Stockton LLP

(57) ABSTRACT

A method of optimizing propagation of non-persistent messages from a source database management system (DBMS) to a destination database management system (DBMS) is described and provided. The method comprises receiving one or more nonpersistent messages from a source non-persistent message queue of the source DBMS at a destination non-persistent message queue of the destination DBMS. The non-persistent messages are consumed from the destination non-persistent message queue such that consumed non-persistent messages are removed from the destination non-persistent message queue. Further, at least a portion of the non-persistent messages are spilled from the destination non-persistent message queue to a destination persistent message queue of the destination DBMS based on at least one parameter selected from a group consisting of a sparseness factor, number of nonpersistent messages in the destination non-persistent message queue, and amount of memory resources utilized by the destination non-persistent message queue. Moreover, to the source DBMS is sent an acknowledgment including a watermark indication of consumed non-persistent messages from the destination non-persistent message queue. Spilled non-persistent messages are characterized as consumed.

21 Claims, 4 Drawing Sheets

U.S. PATENT DOCUMENTS

| | | | |
|---|---|---|---|
| 6,427,146 B1 | 7/2002 | Chu | |
| 6,438,705 B1 | 8/2002 | Chao et al. | |
| 6,560,719 B1 | 5/2003 | Pham et al. | |
| 6,768,994 B1 | 7/2004 | Howard et al. | |
| 6,782,541 B1 | 8/2004 | Cohen et al. | |
| 6,820,136 B1 | 11/2004 | Pham et al. | |
| 6,862,595 B1* | 3/2005 | Elko et al. | 707/10 |
| 6,920,468 B1 | 7/2005 | Cousins et al. | |
| 7,039,671 B2* | 5/2006 | Cullen | 709/201 |
| 7,177,859 B2 | 2/2007 | Pather et al. | |
| 7,584,114 B2 | 9/2009 | Estrada et al. | |
| 7,761,413 B2 | 7/2010 | Surlaker et al. | |
| 2002/0116248 A1 | 8/2002 | Amit et al. | |
| 2002/0165998 A1 | 11/2002 | Hrebejk et al. | |
| 2003/0055768 A1 | 3/2003 | Anaya et al. | |
| 2003/0055829 A1 | 3/2003 | Kambo et al. | |
| 2003/0069959 A1 | 4/2003 | Tse | |
| 2003/0208549 A1 | 11/2003 | El-Shimi et al. | |
| 2004/0024794 A1 | 2/2004 | Jain et al. | |
| 2004/0034664 A1* | 2/2004 | Jain et al. | 707/104.1 |
| 2004/0064430 A1* | 4/2004 | Klein et al. | 707/1 |
| 2004/0088401 A1 | 5/2004 | Tripathi et al. | |
| 2004/0123183 A1 | 6/2004 | Tripathi et al. | |
| 2004/0128344 A1 | 7/2004 | Trossen | |
| 2004/0249853 A1 | 12/2004 | Cohen et al. | |
| 2004/0254993 A1 | 12/2004 | Mamas | |
| 2005/0027742 A1 | 2/2005 | Eichstaedt et al. | |
| 2005/0038772 A1 | 2/2005 | Colrain | |
| 2005/0038791 A1 | 2/2005 | Ven | |
| 2005/0038801 A1 | 2/2005 | Colrain et al. | |
| 2005/0038831 A1 | 2/2005 | Souder et al. | |
| 2005/0038833 A1 | 2/2005 | Colrain et al. | |
| 2005/0038834 A1 | 2/2005 | Souder et al. | |
| 2005/0080819 A1* | 4/2005 | Russell | 707/104.1 |
| 2005/0198273 A1 | 9/2005 | Childress et al. | |
| 2005/0203908 A1 | 9/2005 | Lam et al. | |
| 2006/0200501 A1 | 9/2006 | Holenstein et al. | |
| 2006/0235831 A1 | 10/2006 | Adinolfi et al. | |
| 2006/0277299 A1 | 12/2006 | Baekelmans et al. | |
| 2007/0112885 A1 | 5/2007 | Farr | |
| 2007/0192386 A1 | 8/2007 | Fries et al. | |
| 2007/0214191 A1 | 9/2007 | Chandrasekaran | |
| 2007/0240169 A1 | 10/2007 | Surlaker et al. | |
| 2007/0240170 A1 | 10/2007 | Surlaker et al. | |
| 2007/0250545 A1 | 10/2007 | Surlaker et al. | |
| 2007/0266052 A1 | 11/2007 | Surlaker et al. | |
| 2007/0266393 A1 | 11/2007 | Surlaker et al. | |
| 2007/0276914 A1 | 11/2007 | Surlaker et al. | |
| 2008/0098044 A1 | 4/2008 | Todd | |

OTHER PUBLICATIONS

Hanson et al., "A Flexible and Recoverable Client/server Database Event Notification System," The VLDB Journal; Springer-Verlag, 1998; pp. 12-24, vol. 7.

Cyran, "Oracle Database, Concepts, 10g Release 1 (10.1)", Dec. 2003; pp. 1-732.

"Sun One Messaging and Collaboration Event Notification Service Manual," Sun Microsystems, 2002, pp. 1-18.

Non Final Office Action for U.S. Appl. No. 11/401,560 mailed on Jul. 6, 2009; 21 pages.

Non Final Office Action for U.S. Appl. No. 11/401,658 mailed on Jul. 2, 2009; 18 pages.

Final Office Action for U.S. Appl. No. 11/401,658 mailed on Nov. 3, 2009; 22 pages.

Non-Final Office Action for U.S. Appl. No. 11/408,195 mailed on Dec. 17, 2008; 10 pages.

Final Office Action for U.S. Appl. No. 11/408,195 mailed on Jun. 11, 2009; 17 pages.

Advisory Action for U.S. Appl. No. 11/408,195 mailed on Oct. 8, 2009; 3 pages.

Non-Final Office Action for U.S. Appl. No. 11/471,405 mailed on May 14, 2008; 13 pages.

Final Office Action for U.S. Appl. No. 11/471,405 mailed on Jan. 23, 2009; 15 pages.

Advisory Action for U.S. Appl. No. 11/471,405 mailed on Apr. 13, 2009; 3 pages.

Non-Final Office action for U.S. Appl. No. 11/471,405 mailed on Jul. 7, 2009; 18 pages.

Non Final Office Action for U.S. Appl. No. 11/471,406 mailed on Aug. 18, 2009; 16 pages.

Final Office Action for U.S. Appl. No. 11/401,560 mailed on Dec. 9, 2009; 27 pages.

Advisory Action for U.S. Appl. No. 11/401,560 mailed on Feb. 23, 2010; 3 pages.

Non-Final Office Action for U.S. Appl. No. 11/408,195 mailed on Jan. 20, 2010; 11 pages.

Notice of Allowance for U.S. Appl. No. 11/471,405 mailed on Jan. 26, 2010; 8 pages.

Final Office Action for U.S. Appl. No. 11/471,406 mailed on Feb. 22, 2010; 23 pages.

Non-Final Office Action for U.S. Appl. No. 11/401,560 mailed on Jun. 4, 2010; 34 pages.

Final Office Action for U.S. Appl. No. 11/408,195 mailed on Jun. 30, 2010; 20 pages.

Notice of Allowance for U.S. Appl. No. 11/471,405 mailed on Apr. 20, 2010; 9 pages.

Advisory Action for U.S. Appl. No. 11/471,406 mailed on May 5, 2010; 2 pages.

Advisory Action for U.S. Appl. No. 11/408,195 mailed on Sep. 16, 2010; 3 pages.

* cited by examiner

METHOD OF OPTIMIZING PROPAGATION OF NON-PERSISTENT MESSAGES FROM A SOURCE DATABASE MANAGEMENT SYSTEM TO A DESTINATION DATABASE MANAGEMENT SYSTEM

RELATED U.S. APPLICATION

The present application is a non-provisional of and claims the benefit and priority under 35 U.S.C. §119(e) of provisional patent application, Ser. No. 60/779,754, entitled "DATABASE MANAGEMENT SYSTEM AND METHODS," filed May 10, 2006.

BACKGROUND OF THE INVENTION

1. Field of the Invention

The present invention generally relates to database management system. More particularly, the present invention relates to optimizing propagation of non-persistent messages from a source database management system to a destination database management system.

2. Related Art

Typically, a database management system (DBMS) implements a messaging architecture for information sharing in the DBMS. The messaging architecture includes at least one message queue that functions as a repository for messages. A message may be any type of data. Publishers are entities that publish new messages to the message queue. Subscribers are entities that consume messages from the message queue. The DBMS creates subscribers to the message queue in response to requests from clients. The clients can be database users, software programs, etc. Usually, the subscriber is interested in messages that satisfy a set of rules of the subscriber. Moreover, the creation of subscribers generally requires the creation of specific access privileges to the message queue on a per-subscriber basis to maintain security.

Further, several database management systems (DBMSs) may share messages with each other. For example, a new message published to the message queue of one DBMS is propagated to the message queue of another DBMS. This distributed messaging is generally performed with a certain quality of service, which may be different for each message queue type. Non-persistent message queues, which are implemented in volatile memory, and persistent message queues, which are implemented in non-volatile memory, are examples of message queue types. In the case of non-persistent message queues, an acknowledgment mechanism is utilized to synchronize the propagation of non-persistent messages from the non-persistent message queue of a source DBMS to the non-persistent message queue of a destination DBMS.

SUMMARY OF THE INVENTION

A method of optimizing propagation of non-persistent messages from a source database management system (DBMS) to a destination database management system (DBMS) is described and provided. The method comprises receiving one or more non-persistent messages from a source non-persistent message queue of the source DBMS at a destination non-persistent message queue of the destination DBMS. The non-persistent messages are consumed from the destination non-persistent message queue such that consumed non-persistent messages are removed from the destination non-persistent message queue. Further, at least a portion of the non-persistent messages are spilled from the destination non-persistent message queue to a destination persistent message queue of the destination DBMS based on at least one parameter selected from a group consisting of a sparseness factor, number of non-persistent messages in the destination non-persistent message queue, and amount of memory resources utilized by the destination non-persistent message queue. Moreover, to the source DBMS is sent an acknowledgment including a watermark indication of consumed non-persistent messages from the destination non-persistent message queue. Spilled non-persistent messages are characterized as consumed.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Figure 1:
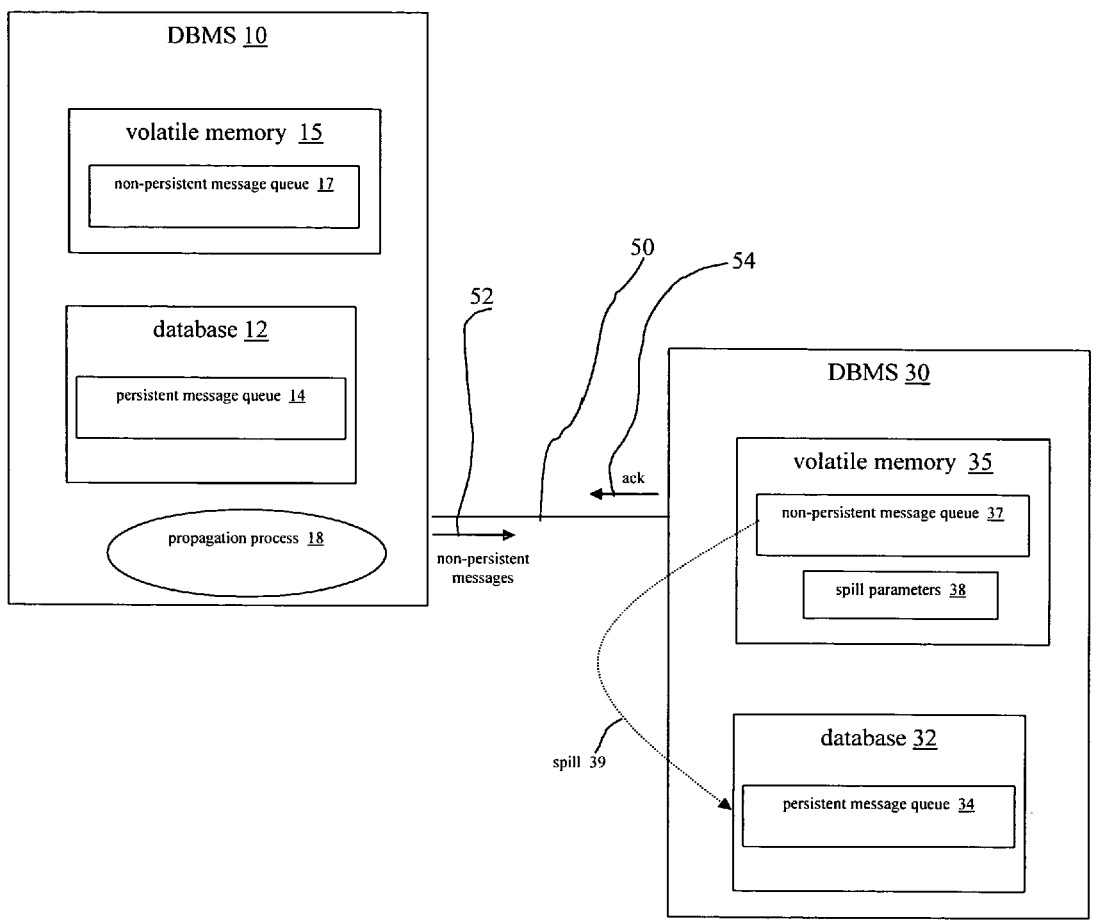
FIG. 1 illustrates a plurality of database management systems in accordance with an embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

As discussed above, in the case of non-persistent message queues, an acknowledgment mechanism is utilized to synchronize the propagation of non-persistent messages from the source non-persistent message queue of a source DBMS to the destination non-persistent message queue of a destination DBMS. For performances reasons, the acknowledgments are generated in a watermark manner rather than on a per-message basis. That is, the destination DBMS sends to the source DBMS an acknowledgment having a watermark indication of consumed non-persistent messages by subscribers from the destination non-persistent message queue of the destination DBMS.

For example, if non-persistent message #1 through non-persistent message #56 have been consumed, the watermark would indicate that the messages "up to non-persistent message #56" have been consumed from the destination non-persistent message queue of the destination DBMS. Thus, the source DBMS is able to remove from the source non-persistent message queue any of the non-persistent messages "up to non-persistent message #56" that is no longer needed. If non-persistent message #1 through non-persistent message #5 and non-persistent message #17 through non-persistent message #60 have been consumed from the destination non-persistent message queue of the destination DBMS, the watermark would indicate that the messages "up to non-persistent message #5" have been consumed since non-persistent message #6 through non-persistent message #16 have not been consumed. Thus, the source DBMS is able to remove from the source non-persistent message queue any of the non-persistent messages "up to non-persistent message #5" that is no longer needed. However, the source DBMS has to maintain non-persistent message #17 through non-persistent message #60 because the watermark only indicates messages "up to non-persistent message #5" have been consumed from the destination non-persistent message queue of the destination DBMS, increasing memory usage by the source non-persistent message queue of the source DBMS.

The above examples assume the quality of service of the distributed messaging or propagation of non-persistent messages is "at least once delivery guarantee". That is, a non-persistent message will be delivered from the source DBMS to the destination DBMS at least once. The quality of service may be changed to another quality of service. Also, the above examples illustrate that the acknowledgment impacts the performance of the source DBMS and the amount of memory resources utilized by the source non-persistent message queue of the source DBMS since the non-persistent messages may be consumed according to one pattern by subscribers in the source DBMS but a different pattern by subscribers in the destination DBMS.

To alleviate the impact of acknowledgment on the performance of the source DBMS and the amount of memory resources utilized by the source non-persistent message queue of the source DBMS, non-persistent messages from the destination non-persistent message queue of the destination DBMS are spilled to a destination persistent message queue of the destination DBMS. A placeholder for each spilled non-persistent message is created in the destination non-persistent message queue. Since spilled non-persistent message are recoverable for consumption by subscribers after the occurrence of failures, each spilled non-persistent message is characterized as consumed when computing the acknowledgment sent to the source DBMS even though the spilled non-persistent message has actually not been consumed by a subscriber.

However, spilling is an undesirable operation because there is better performance from the usage of the non-persistent message queue instead of the persistent message queue and because the overhead costs of the persistent database tables for the persistent message queue are avoided. Moreover, spilling is usually performed on an ad hoc basis without a strategy.

In contrast, the invention is directed to implementing a spilling strategy that optimizes performance and memory usage in distributed messaging. That is, a spill operation is performed when it leads to higher performance and lower memory usage in distributed messaging.

FIG. 1 illustrates a plurality of database management systems 10 and 30 in accordance with an embodiment of the present invention. The database management system (DBMS) 10 and the database management system (DBMS) 30 implement distributed messaging or propagation of messages, where DBMS 10 is the source DBMS while DBMS 30 is the destination DBMS. That is, DBMS 10 sends messages from its message queue to a message queue of DBMS 30. It should be understood that distributed messaging can involve more than two database management systems.

Although the discussion will focus on propagation of non-persistent messages from DBMS 10 to DBMS 30, the invention is applicable to other message types.

DBMS 10 includes a volatile memory 15 and a database 12 for persistent storage. A non-persistent message queue 17 is implemented in the volatile memory 15. A persistent message queue 14 is implemented in the database 12. Further, DBMS 10 has a propagation process 18 for facilitating the propagation of non-persistent message from DBMS 10 to DBMS 30. A communication link 50 connects DBMS 10 and DBMS 30. DBMS 10 sends non-persistent messages 52 from the non-persistent message queue 17 via communication link 50. DBMS 30 sends an acknowledgment 54 via communication link 50. The acknowledgment 54 includes a watermark indication of consumed non-persistent messages from the non-persistent message queue 37 of DBMS 30, wherein spilled non-persistent messages are characterized as consumed.

DBMS 30 includes a volatile memory 35 and a database 32 for persistent storage. A non-persistent message queue 37 is implemented in the volatile memory 35. A persistent message queue 34 is implemented in the database 32.

Moreover, the volatile memory 35 stores spill parameters 38 for determining whether to perform a spill operation 39. In a spill operation 39, non-persistent messages from the non-persistent message queue 37 are spilled to the persistent message queue 34. A placeholder for each spilled non-persistent message is created in the non-persistent message queue 37. Moreover, each spilled non-persistent message is characterized as consumed when computing an acknowledgment to be sent to DBMS 10 even though the spilled non-persistent message has actually not been consumed by a subscriber.

In an embodiment, spill parameters 38 include a sparseness factor, number of non-persistent messages in the non-persistent message queue 37, and amount of memory resources utilized by the non-persistent message queue 37. All or a subset of these spill parameters 38 may be utilized to initiate the spill operation 39 and select the number of non-persistent messages to spill. The spill parameters 38 optimize performance and memory usage in distributed messaging because the spill operation 38 is performed when it leads to higher performance and lower memory usage in distributed messaging. In an embodiment, threshold values are set for each of the spill parameters 38. The initiation of the spill operation 39 and the selection of non-persistent messages to spill are intended to reduce the values of the spill parameters 38 below the threshold values.

The sparseness factor represents dividing the number of non-persistent messages in the non-persistent message queue 37 into the difference between the highest non-persistent message number and the lowest non-persistent message number in the non-persistent message queue 37. A lower sparseness factor is better than a higher sparseness factor. For example, if non-persistent message #3 and non-persistent message #63 remain unconsumed in non-persistent message queue 37, the sparseness factor is 30[(63−3)/2]. Assuming the threshold value for the sparseness factor is set to 7, the spill operation 39 will be initiated and the non-persistent messages #3 and #63 will be selected for spilling to reduce the value of the sparseness factor below the threshold value of 7. Thus, DBMS 30 will be able to compute an acknowledgment 54 having the watermark indicating that the messages "up to non-persistent message #63" have been consumed. Therefore, DBMS 10 is able to remove from the non-persistent message queue 17 any of the non-persistent messages "up to non-persistent message #63" that is no longer needed, increasing performance and reducing memory usage.

Prior to the spill operation 39, the acknowledgment 54 had a watermark indicating that the messages "up to non-persistent message #2" have been consumed. Performance of the spill operation 39 sufficiently increased the watermark level from #2 to #63 to justify the costs of the spill operation 39.

The other spill parameters 38 (the number of non-persistent messages in the non-persistent message queue 37 and amount of memory resources utilized by the non-persistent message queue 37) deal with other situations that reduce performance and increase memory usage. If the consumption rate of non-persistent messages from the non-persistent message queue 37 lags the rate at which DBMS 10 sends new non-persistent messages to the non-persistent message queue 37, there will be an accumulation of non-persistent messages in the non-persistent message queue 37. Performance of the spill operation 39 reduces number of non-persistent messages in the non-persistent message queue 37 and increases the watermark for the acknowledgment, enabling DBMS 10 to remove from the non-persistent message queue 17 any of the non-persistent messages up to the watermark that is no longer needed.

Some non-persistent messages are small while other non-persistent messages are large and utilize more memory resources. For example, if the watermark level is #56 and non-persistent message #67 is received that utilizes memory resources comparable to combined non-persistent messages #57-#66, it is evident that non-persistent message #67 utilizes a disproportionate amount of memory resources. Performance of the spill operation 39 to spill non-persistent messages #57-#67 increases the watermark for the acknowledgment to #67, enabling DBMS 10 to remove from the non-persistent message queue 17 any of the non-persistent messages up to the watermark that is no longer needed. Removal of non-persistent message #67 from the non-persistent message queue 17 significantly reduces memory usage.

Figure 2:
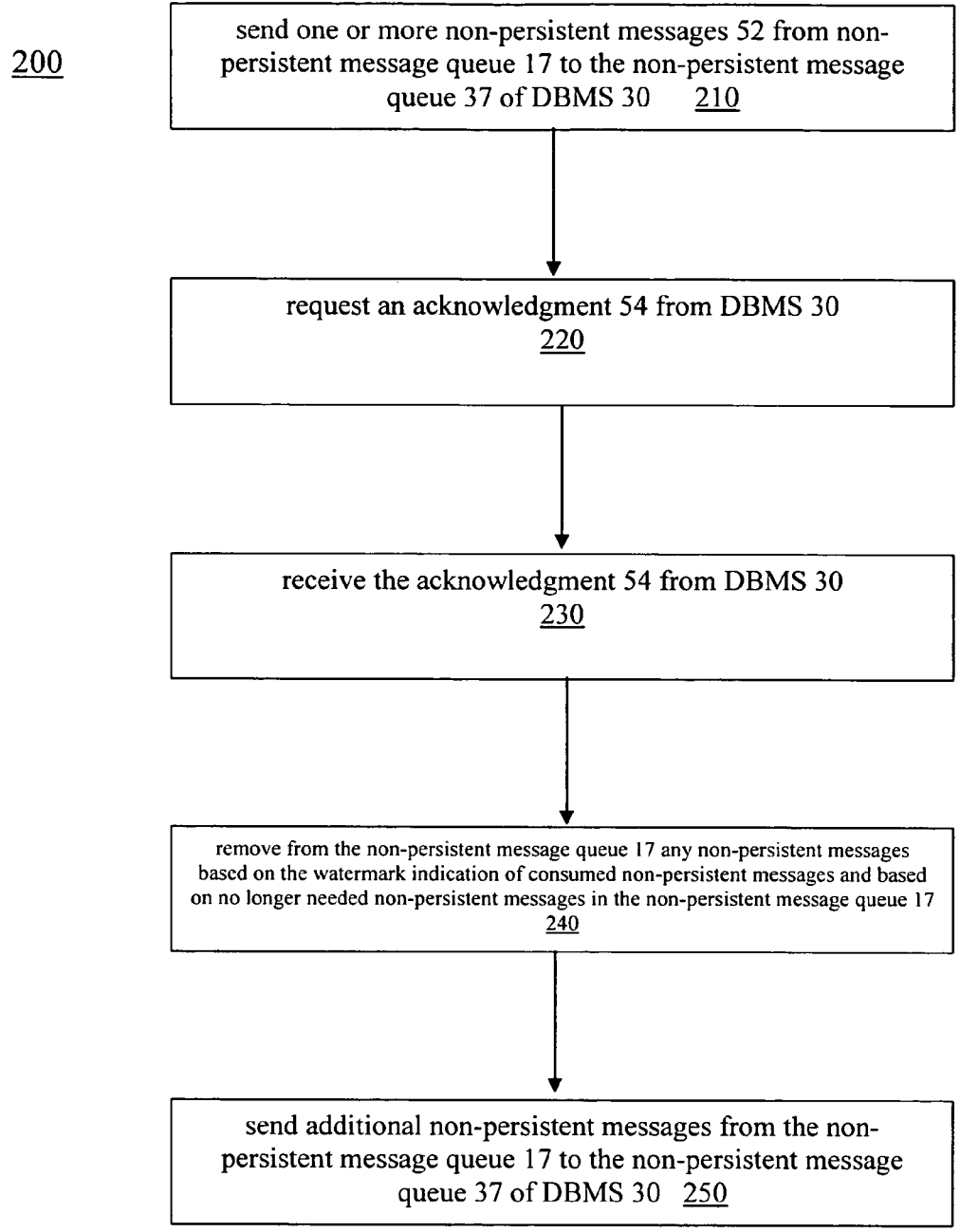
FIG. 2 illustrates a flow chart showing a method of optimizing propagation of non-persistent messages from a source database management system (DBMS) to a destination database management system (DBMS) from the perspective of the source DBMS in accordance with an embodiment of the present invention.

FIG. 2 illustrates a flow chart showing a method 200 of optimizing propagation of non-persistent messages from a source database management system (DBMS) to a destination database management system (DBMS) from the perspective of the source DBMS in accordance with an embodiment of the present invention. Reference is made to FIG. 1. In an embodiment, a quality of service of the propagation of non-persistent messages is at least once delivery guarantee.

At Block 210, DBMS 10 sends one or more non-persistent messages 52 from non-persistent message queue 17 to the non-persistent message queue 37 of DBMS 30. The propagation process 18 facilitates the sending of the non-persistent messages 52.

Continuing, at Block 220, DBMS 10 requests an acknowledgment 54 from DBMS 30, where the acknowledgment 54 includes a watermark indication of consumed non-persistent messages from the non-persistent message queue 37 of DBMS 30 and where spilled non-persistent messages are characterized as consumed. The request may be part of the sent non-persistent messages 52.

At Block 230, DBMS 10 receives the acknowledgment 54 from DBMS 30. Moreover, at Block 240, in response to the acknowledgment 54, DBMS 10 removes from the non-persistent message queue 17 any non-persistent messages based on the watermark indication of consumed non-persistent messages and based on no longer needed non-persistent messages in the non-persistent message queue 17. For example, if the watermark is non-persistent message #34, DBMS 10 removes from the non-persistent message queue 17 any of the non-persistent messages up to non-persistent message #34 that is no longer needed.

Further, at Block 250, DBMS 10 sends additional non-persistent messages from the non-persistent message queue 17 to the non-persistent message queue 37 of DBMS 30. The propagation process 18 facilitates the sending of the additional non-persistent messages 52.

Figure 3:
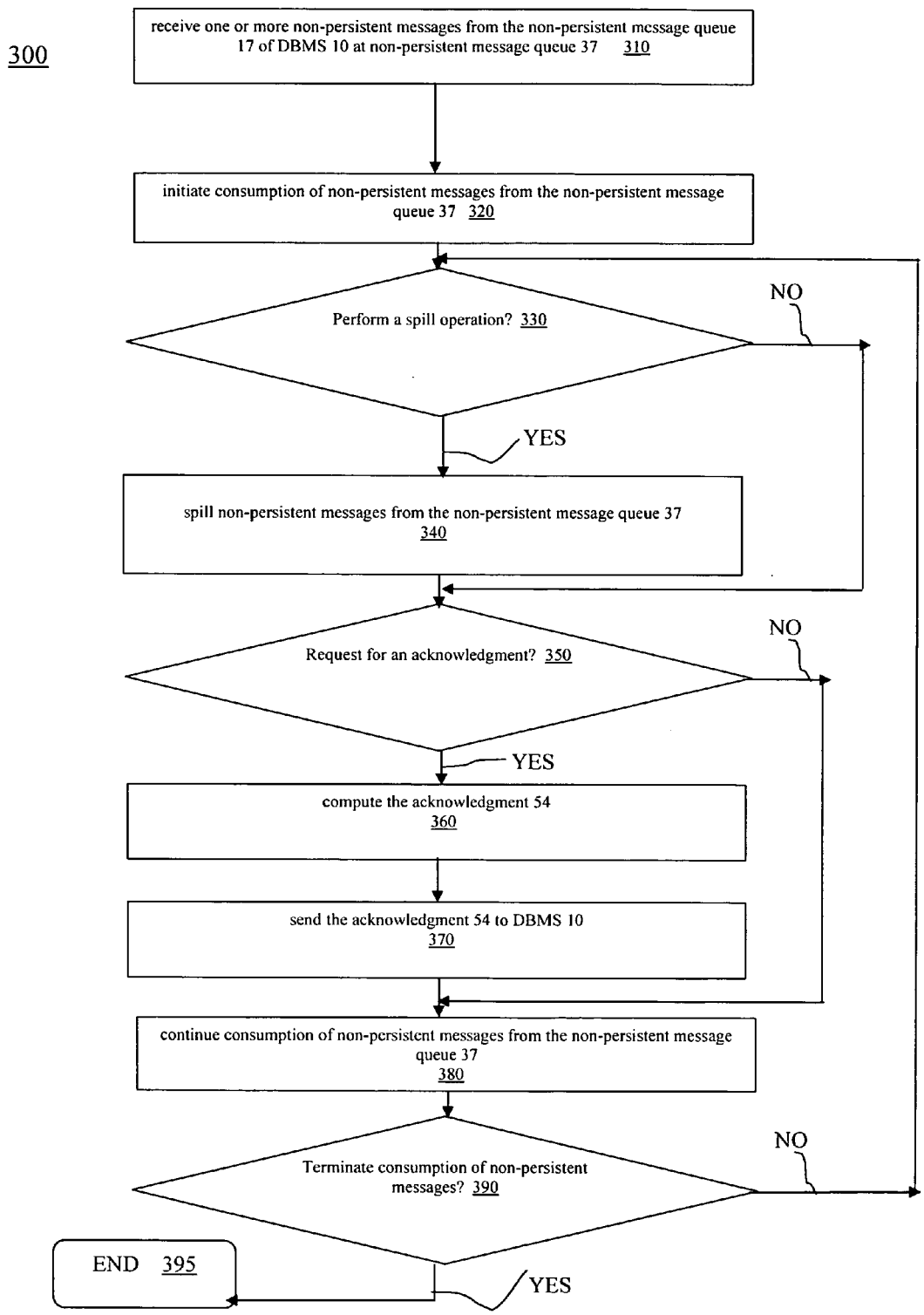
FIG. 3 illustrates a flow chart showing a method of optimizing propagation of non-persistent messages from a source database management system (DBMS) to a destination database management system (DBMS) from the perspective of the destination DBMS in accordance with an embodiment of the present invention.

FIG. 3 illustrates a flow chart showing a method 300 of optimizing propagation of non-persistent messages from a source database management system (DBMS) to a destination database management system (DBMS) from the perspective of the destination DBMS in accordance with an embodiment of the present invention. Reference is made to FIG. 1. In an embodiment, a quality of service of the propagation of non-persistent messages is at least once delivery guarantee.

At Block 310, DBMS 30 receives one or more non-persistent messages from the non-persistent message queue 17 of DBMS 10 at its non-persistent message queue 37.

Continuing, at Block 320, consumption of non-persistent messages from the non-persistent message queue 37 by subscribers is initiated such that consumed non-persistent messages are removed from the non-persistent message queue 37.

At Block 330, it is determined whether to perform a spill operation 39 based on all or a subset of the spill parameters 38 (e.g., a sparseness factor, number of non-persistent messages in the non-persistent message queue 37, and amount of memory resources utilized by the non-persistent message queue 37). In an embodiment, a threshold value is set for each spill parameter 38 to facilitate determination of whether to perform the spill operation 39.

If a determination is made to perform the spill operation 39, all or a subset of the spill parameters 38 are utilized to perform the spill operation 39 and select the non-persistent messages from the non-persistent message queue 37 to spill, at Block 340.

Continuing, at Block 350, it is determined whether a request for an acknowledgment 54 has been received by DBMS 30.

If the request for the acknowledgment 54 has been received, DBMS 30 computes the acknowledgment 54, at Block 360. The acknowledgment 54 includes a watermark indication of consumed non-persistent messages from the non-persistent message queue 37 of DBMS 30, wherein spilled non-persistent messages are characterized as consumed.

At Block 370, DBMS 30 sends the acknowledgment 54 to DBMS 10. Moreover, at Block 380, consumption of non-persistent messages from the non-persistent message queue 37 continues.

Furthermore, at Block 390, it is determined whether to terminate consumption of non-persistent messages from the non-persistent message queue 37. If consumption of non-persistent messages from the non-persistent message queue 37 is terminated, the method 300 ends, at Block 395. Otherwise, the method 300 returns to Block 330.

In an embodiment, the invention is configured as computer-executable instructions stored in a computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

Figure 4:
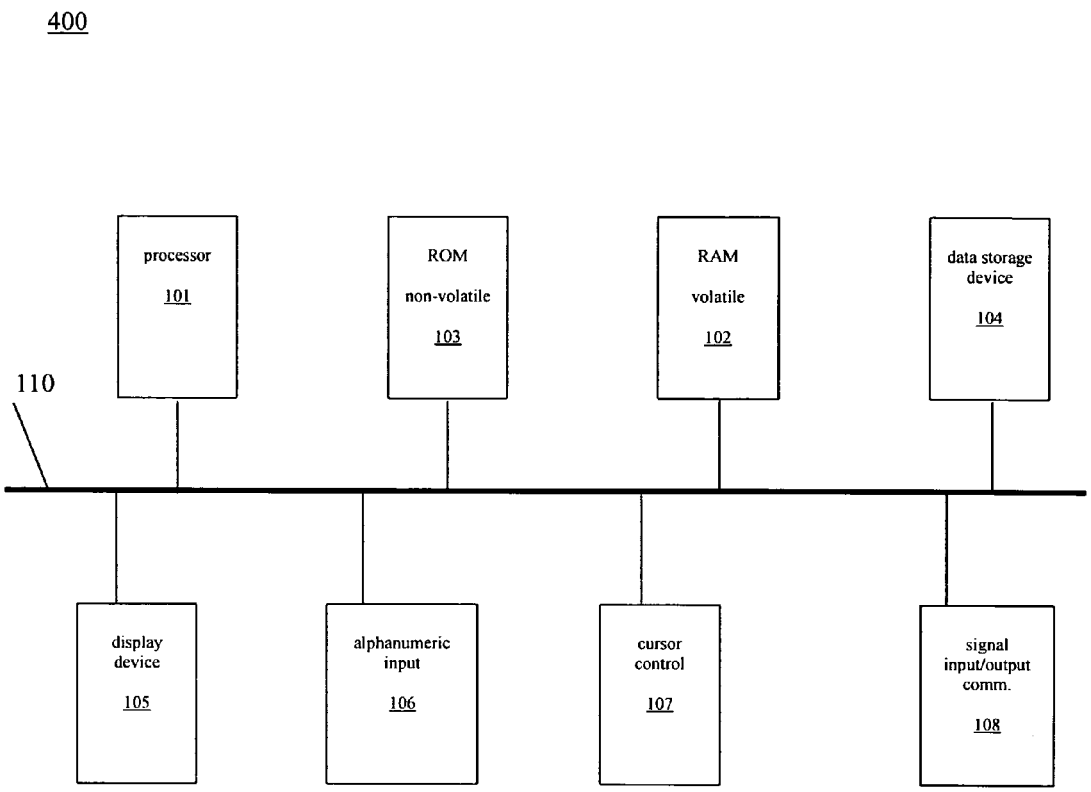
FIG. 4 illustrates an exemplary computer system on which embodiments of the present invention may be practiced.

FIG. 4 illustrates an exemplary computer system 400 on which embodiments of the present invention may be practiced. Aspects of the present invention can be implemented or executed on a computer system or any other computational system. Although a variety of different computer systems can be used with the present invention, an exemplary computer system 400 is shown in FIG. 4.

With reference to FIG. 4, portions of the present invention are comprised of computer-readable and computer executable instructions which reside, for example, in computer-usable media of an electronic system such as the exemplary computer system 400. FIG. 4 illustrates an exemplary computer system 400 on which embodiments of the present invention may be practiced. It is appreciated that the computer system 400 of FIG. 4 is exemplary only and that the present invention can operate within a number of different computer systems including general-purpose computer systems and embedded computer systems.

Computer system 400 includes an address/data bus 110 for communicating information, a central processor 101 coupled with bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Exemplary computer system 400 also includes a data storage device 104 ("disk subsystem") such as a magnetic or optical disk and disk drive coupled with the bus 110 for storing information and instructions. Data storage device 104 can include one or more removable magnetic or optical storage media (e.g., diskettes, tapes), which are computer-readable memories. Memory units of computer system 400 include volatile memory 102, non-volatile memory 103 and data storage device 104.

Exemplary computer system 400 can further include a signal input/output communication device 108 (e.g., a network interface card "NIC") coupled to the bus 110 for interfacing with other computer systems. Also included in exemplary computer system 400 of FIG. 4 is an alphanumeric input device 106 including alphanumeric and function keys coupled to the bus 110 for communicating information and command selections to the central processor 101. Exemplary computer system 400 also includes a cursor control or directing device 107 coupled to the bus 110 for communicating user input information and command selections to the central processor 101. A display device 105 can also be coupled to the bus 110 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two-dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of optimizing propagation of non-persistent messages from a source database management system (DBMS) to a destination database management system (DBMS), said method comprising:

receiving, by said destination DBMS, one or more non-persistent messages from a source non-persistent message queue of said source DBMS at a destination non-persistent message queue of said destination DBMS;

consuming, by said destination DBMS, said non-persistent messages from said destination non-persistent message queue such that consumed non-persistent messages are removed from said destination non-persistent message queue;

generating, by said destination DBMS, a sparseness factor based at least in part on a number of non-persistent messages in said destination non-persistent message queue, the highest non-persistent message number of said destination non-persistent message queue, and the lowest non-persistent message number of said destination non-persistent message queue;

selectively spilling, by said destination DBMS, at least a portion of said non-persistent messages from said destination non-persistent message queue to a destination persistent message queue of said destination DBMS based on at least one parameter selected from a group consisting of: said sparseness factor, said number of non-persistent messages in said destination non-persistent message queue, and an amount of memory resources utilized by said destination non-persistent message queue; and sending, by said destination DBMS to said source DBMS, an acknowledgment including a watermark indication of consumed non-persistent messages from said destination non-persistent message queue, wherein spilled non-persistent messages that have not yet been consumed are characterized in the watermark indication as consumed.

2. The method as recited in claim 1 further comprising:
in response to said acknowledgment, removing from said source non-persistent message queue one or more non-persistent messages based on said watermark indication of consumed non-persistent messages and based on no longer needed non-persistent messages in said source non-persistent message queue.

3. The method as recited in claim 1 wherein said sending to said source DBMS an acknowledgment, comprises:
receiving a request for said acknowledgment from said source DBMS; and
computing said acknowledgment.

4. The method as recited in claim 1 further comprising:
sending additional non-persistent messages from said source non-persistent message queue of said source DBMS to said destination non-persistent message queue of said destination DBMS; and
receiving said additional non-persistent messages at destination non-persistent message queue.

5. The method as recited in claim 1 wherein a quality of service of said propagation of non-persistent messages is at least once delivery guarantee.

6. The method as recited in claim 1 further comprising:
setting threshold values for said sparseness factor, said number of non-persistent messages in said destination non-persistent message queue, and said amount of memory resources utilized by said destination non-persistent message queue.

7. The method as recited in claim 6 wherein said spilling at least a portion of said non-persistent messages is performed to reduce values of said sparseness factor, said number of non-persistent messages in said destination non-persistent message queue, and said amount of memory resources utilized by said destination non-persistent message queue below said threshold values.

8. A non-transitory computer-readable medium comprising computer-executable instructions stored therein for optimizing propagation of non-persistent messages from a source database management system (DBMS) to a destination database management system (DBMS), the computer-executable instructions comprising:
  instructions that cause said destination DBMS to receive one or more non-persistent messages from a source non-persistent message queue of said source DBMS at a destination non-persistent message queue of said destination DBMS;
  instructions that cause said destination DBMS to consume said non-persistent messages from said destination non-persistent message queue such that consumed non-persistent messages are removed from said destination non-persistent message queue;
  instructions that cause said destination DBMS to generate a sparseness factor based at least in part on a number of non-persistent messages in said destination non-persistent message queue, the highest non-persistent message number of said destination non-persistent message queue, and the lowest non-persistent message number of said destination non-persistent message queue;
  instructions that cause the destination DBMS to spill at least a portion of said non-persistent messages from said destination non-persistent message queue to a destination persistent message queue of said destination DBMS based on at least one parameter selected from a group consisting of said sparseness factor, said number of non-persistent messages in said destination non-persistent message queue, and an amount of memory resources utilized by said destination non-persistent message queue; and
  instructions that cause the destination DBMS to send to said source DBMS an acknowledgment including a watermark indication of consumed non-persistent messages from said destination non-persistent message queue, wherein spilled non-persistent messages that have not yet been consumed are characterized in the watermark indication as consumed.

9. The non-transitory computer-readable medium as recited in Claim 8 wherein said computer-executable instructions further comprise:
  instructions that cause the destination DBMS to, in response to said acknowledgment, remove from said source non-persistent message queue one or more non-persistent messages based on said watermark indication of consumed non-persistent messages and based on no longer needed non-persistent messages in said source non-persistent message queue.

10. The non-transitory computer-readable medium as recited in claim 8 wherein said sending to said source DBMS an acknowledgment, comprises:
  receiving a request for said acknowledgment from said source DBMS; and
  computing said acknowledgment.

11. The non-transitory computer-readable medium as recited in claim 8 wherein said computer-executable instructions further comprise:
  instructions that cause the destination DBMS to send additional non-persistent messages from said source non-persistent message queue of said source DBMS to said destination non-persistent message queue of said destination DBMS; and
  instructions that cause the destination DBMS to receive said additional non-persistent messages at said destination non-persistent message queue.

12. The non-transitory computer-readable medium as recited in claim 8 wherein a quality of service of said propagation of non-persistent messages is at least once delivery guarantee.

13. The non-transitory computer-readable medium as recited in claim 8 wherein said computer-executable instructions further comprise:
  instructions that cause the destination DBMS to set threshold values for said sparseness factor, said number of non-persistent messages in said destination non-persistent message queue, and said amount of memory resources utilized by said destination non-persistent message queue.

14. The non-transitory computer-readable medium as recited in claim 13 wherein said spilling at least a portion of said non-persistent messages is performed to reduce values of said sparseness factor, said number of non-persistent messages in said destination non-persistent message queue, and said amount of memory resources utilized by said destination non-persistent message queue below said threshold values.

15. An apparatus comprising:
  a memory comprising instructions stored therein; and
  a processor for executing said instructions to optimize propagation of non-persistent messages from a source database management system (DBMS) to a destination database management system (DBMS), the processor being configured to:
  receive one or more non-persistent messages from a source non-persistent message queue of said source DBMS at a destination non-persistent message queue of said destination DBMS;
  consume said non-persistent messages from said destination non-persistent message queue such that consumed non-persistent messages are removed from said destination non-persistent message queue;
  generate a sparseness factor based at least in part on a number of non-persistent messages in said destination non-persistent message queue, the highest non-persistent message number of said destination non-persistent message queue, and the lowest non-persistent message number of said destination non-persistent message queue;
  selectively spill at least a portion of said non-persistent messages from said destination non-persistent message queue to a destination persistent message queue of said destination DBMS based on at least one parameter selected from a group consisting of: said sparseness factor, said number of non-persistent messages in said destination non-persistent message queue, and an amount of memory resources utilized by said destination non-persistent message queue; and
  send to said source DBMS an acknowledgment including a watermark indication of consumed non-persistent messages from said destination non-persistent message queue, wherein spilled non-persistent messages that have not yet been consumed are characterized in the watermark indication as consumed.

16. The apparatus as recited in claim 15 wherein said processor is further configured to:

in response to said acknowledgment, remove from said source non-persistent message queue one or more non-persistent messages based on said watermark indication of consumed non-persistent messages and based on no longer needed non-persistent messages in said source non-persistent message queue.

17. The apparatus as recited in claim 15 wherein said sending to said source DBMS an acknowledgment, comprises:

receiving a request for said acknowledgment from said source DBMS; and computing said acknowledgment.

18. The apparatus as recited in claim 15 wherein said processor is further configured to:

send additional non-persistent messages from said source non-persistent message queue of said source DBMS to said destination non-persistent message queue of said destination DBMS; and receive said additional non-persistent messages at destination non-persistent message queue.

19. The apparatus as recited in claim 15 wherein a quality of service of said propagation of non-persistent messages is at least once delivery guarantee.

20. The apparatus as recited in claim 15 wherein said processor is further configured to:

set threshold values for said sparseness factor, said number of non-persistent messages in said destination non-persistent message queue, and said amount of memory resources utilized by said destination non-persistent message queue.

21. The apparatus as recited in claim 20 wherein said spilling at least a portion of said non-persistent messages is performed to reduce values of said sparseness factor, said number of non-persistent messages in said destination non-persistent message queue, and said amount of memory resources utilized by said destination non-persistent message queue below said threshold values.

* * * * *

UNITED STATES PATENT AND TRADEMARK OFFICE
CERTIFICATE OF CORRECTION

| | |
|---|---|
| PATENT NO. | : 7,895,600 B2 |
| APPLICATION NO. | : 11/471167 |
| DATED | : February 22, 2011 |
| INVENTOR(S) | : Surlaker et al. |

It is certified that error appears in the above-identified patent and that said Letters Patent is hereby corrected as shown below:

In column 1, line 11, delete "60/779,754" and insert -- 60/799,754 --, therefor.

In column 9, line 39, in Claim 8, delete "of said" and insert -- of: said --, therefor.

Signed and Sealed this
Eleventh Day of October, 2011

David J. Kappos
*Director of the United States Patent and Trademark Office*